US005418377A

United States Patent [19]

Tran et al.

[11] Patent Number: 5,418,377

[45] Date of Patent: May 23, 1995

[54] PIXELIZED PHOSPHOR

[75] Inventors: Nang T. Tran, Lake Elmo; Kenneth R. Paulson, Oakdale, both of Minn.

[73] Assignee: Minnesota Mining and Manufacturing Company, St. Paul, Minn.

[21] Appl. No.: 195,357

[22] Filed: Feb. 10, 1994

Related U.S. Application Data

[63] Continuation-in-part of Ser. No. 90,882, Jul. 9, 1993, Pat. No. 5,302,423.

[51] Int. Cl.[6] .......... G01T 1/20

[52] U.S. Cl. .......... 250/483.1; 250/486.1; 250/487.1

[58] Field of Search .......... 250/483.1, 486.1, 487.1, 250/370.11, 367, 368; 427/555

[56] References Cited

U.S. PATENT DOCUMENTS

| | | | |
|---|---|---|---|
| 3,041,456 | 6/1962 | MacLeod | 250/486.1 |
| 3,643,092 | 2/1972 | van der Feyst | 250/486.1 |
| 3,936,645 | 2/1976 | Iversen | 250/370.11 |
| 4,831,262 | 5/1989 | Govaert et al. | 250/367 |
| 5,091,650 | 2/1992 | Uchida et al. | 250/367 |
| 5,120,619 | 6/1992 | Nakajima et al. | 250/483.1 |
| 5,153,438 | 10/1992 | Kingsley et al. | 250/370.09 |
| 5,227,633 | 7/1993 | Ryuo et al. | 250/367 |
| 5,227,634 | 7/1993 | Ryuo et al. | 250/367 |
| 5,302,423 | 4/1994 | Tran et al. | 427/555 |

*Primary Examiner*—Paul M. Dzierzynski
*Assistant Examiner*—Richard Hanig
*Attorney, Agent, or Firm*—Gary L. Griswold; Walter N. Kirn; Gregory A. Evearitt

[57] ABSTRACT

A pixelized phosphor screen having an array of pixelized phosphors on a support which are separated a width of from greater than 0.0 to 5.0 microns. In order to produce the phosphor screen, phosphor is deposited on a support and then exposed to radiation to create an array of pixelized phosphors separated by slots. The resulting slots between the pixelized phosphors are then filled in with additional phosphor material such that the width between the pixelized phosphors is from greater than 0.0 to 5.0 microns.

7 Claims, 1 Drawing Sheet

PIXELIZED PHOSPHOR

This is a continuation-in-part of U.S. patent application Ser. No. 08/090,882, filed Jul. 9, 1993, now U.S. Pat. No. 5,302,423.

FIELD OF THE INVENTION

This invention relates to a process for the fabrication of a phosphor and more particularly, it relates to a process for the fabrication of a pixelized or cellularized phosphor. It also relates to a pixelized phosphor made according to the above-mentioned process.

BACKGROUND OF THE ART

In the field of X-ray detection it is well-known to employ so-called intensifying screens to increase the radiation available for detection purposes. Such screens contain an X-ray luminescent material which is selected to emit a relatively large number of light photons for each X-ray photon striking the material. This effectively amplifies the X-rays to be detected since both the X-rays themselves and light emitted by X-ray-induced emission from the luminescent material are available for detection on film or other detection mediums or devices, such as arrays of light-sensitive electronic sensors. The primary incentive to use such intensifying screens in medical applications is to reduce the amount of X-ray radiation which is required to produce a given exposure, thereby reducing the radiation risk to which a patient or operator is exposed.

It is known that such intensifying screens, while increasing the amount of radiation available for detection, also have the effect of reducing the sharpness of the resultant image. In general, image distortion in luminescent screens or structures is caused by the diffusion of light within the luminescent material which causes a blurring of the image with consequent loss of definition and contrast. This diffusion of light is brought about by two fundamental physical processes. First, as the ionizing radiation is converted into light, the direction of emission of light is random so that it is emitted approximately equally in all directions. The second effect is that the high energy radiation is penetrating, the degree of penetration being dependent upon the energy of the impinging radiation and the nature of the material being penetrated. The higher the energy, the deeper the penetration. A lower density material will also lead to a deeper penetration.

Thus, it is seen that as visible light is generated along a path through the screen and normal to its surface, light will be radiating in all directions. Some of the light radiated at an angle off the normal to the surface of the screen will reach the film or other detecting means and result in a diffuse image.

As a result, the design of such intensifying screens has involved a trade-off between screens of large thickness, which result in increased luminescent radiation for a given X-ray level, but which also produce decreased image sharpness, and screens of less thickness, which result in improved image sharpness relative to the thicker screens, but which also require more X-ray radiation to produce acceptable film images, thereby increasing the X-ray dosage to which the patient must be exposed. In practice, the thicker or high speed screens are utilized in those applications which do not require maximum image sharpness, thereby reducing the patient exposure to X-rays, while medium speed and slow speed screens are utilized when increased image resolution is required. These latter screens employ thinner phosphor layers and may incorporate dyes to minimize transverse propagation of light by attenuating such rays more than a normal ray which travels a shorter path. In general, detail or slow speed screens require approximately 8 times the X-ray dosage of high speed screens.

Several patents have proposed solutions to the problem of reducing the amount of scattered luminescent radiation which reaches the film or other detector from such screens. These patents have suggested a cellularized or pixelized approach to the construction of such screens, the structure generally consisting of volumes of luminescent material separated by wall members. The wall members are disposed generally parallel to the direction of X-ray travel and their purpose is to reflect light emitted by the luminescent material and thereby prevent scattered light from reaching the detection means.

One such approach is taught in U.S. Pat. No. 3,041,456, in which a rectangular body of plastic having a luminescent phosphor dispersed therein is sliced into thin slices which are then coated on one or both sides with a reflective material. These coated slices are then bonded back together and sliced again in a direction transverse to that of the first slicing. These coating and bonding operations are repeated to produce a double laminated body from which screens of the desired thickness may be obtained. The approach of this patent, while being theoretically attractive, presents significant problems in manufacturing because of the requirement to repeatedly handle and align extremely small pieces of the phosphor without damage or contamination.

An alternative approach is suggested in U.S. Pat. No. 3,643,092. The structures proposed there employ adjacent walls having a corrugated member disposed therebetween so as to form a plurality of chambers extending in the direction of X-ray travel. At least a portion of each of these chambers is filled with a luminescent phosphor which reacts to X-ray radiation in the manner described above to produce light. The chamber structure is such that the walls thereof, formed by the planar wall members and the corrugated member, confine and/or reflect emitted light so as to limit the amount of scattered radiation reaching the detection means. The structures proposed in this patent, like that of U.S. Pat. No. 3,041,456, are attractive in theory, but present problems in fabrication because of the requirement to handle the small and fragile components.

Other literature has suggested that chemical etching or milling be employed to produce grooves in a phosphor material, the grooves then being filled or plated with a highly reflective material to form light reflecting walls. However, this type of etching or milling produces surfaces which are relatively rough, so that even though subsequently plated or coated, they do not provide a good reflective surface. Such relatively rough surfaces have the effect of producing multiple reflections so that much of the light is lost through severe scattering.

An additional disadvantage of such chemical milling or etching is that the walls produced must be at least 0.003–0.010 inches thick in order to provide sufficient strength for handling of the structure. Walls of this thickness are discernable and result in corresponding lines appearing in the image on the film, thereby reducing the resolution. Additionally, walls of this thickness reduce the amount of available phosphor by a corresponding amount, thus reducing the light output from the structure. Further, these structures have the disadvantage that the circumference of walls are continuous and rigid so that when the phosphor cures after being poured or impregnated into the cells, shrinkage or expansion may occur. This often results in fracturing of the phosphor with a resultant poor light transmission due to the separated interface at the fracture.

U.S. Pat. No. 3,936,645 discloses a cellularized luminescent structure which is fabricated by utilizing a laser to cut narrow slots in the luminescent material in both the X and Y directions. The slots are then filled with material which is opaque to either light or radiation or both. There is no disclosure of utilizing a phosphor material, however, to fill in the slots to create cellularized ("pixelized") phosphors separated by slots as narrow as 0.3 microns in width.

U.S. Pat. No. 5,153,438 discloses a structured scintillator material wherein the gaps between the individual scintillator elements are preferably filled in with a reflective material such as titanium dioxide, magnesium oxide, etc., in order to maximize the portion of light within each element that is collected by its associated photosensitive cell. In this patent, the individual elements are formed by preferential deposition of the phosphor over structures existing on the surface of the substrate. Again, as with U.S. Pat. No. 3,936,645, there is no disclosure in the '438 patent of utilizing a phosphor material to fill in slots to create pixelized phosphors separated by slots as narrow as 0.3 microns in width.

SUMMARY OF THE INVENTION

In accordance with the present invention, there are provided pixelized or cellularized phosphor screens comprising an array of pixelized phosphors on a support which are separated by a width of from greater than 0.0 to 5.0 microns, preferably from about 0.1 to 5.0 microns. The pixel size is preferably in the range of about 85×85 microns, and more preferably, about 50×50 microns. The inventive phosphors have active areas as high as 90% or greater and have high resolutions for a given phosphor thickness.

The inventive phosphors are made by the process comprising the following steps:

(a) depositing a phosphor on a support;

(b) exposing the deposited phosphor to a source of electromagnetic radiation through a mask, thereby removing the phosphor segmentally, resulting in a series of structures in both the X and Y directions to produce an array of pixelized phosphors separated by slots; and (c) falling the resulting slots between the pixelized phosphors with phosphor material of the same or different composition as utilized in step (a) such that each of the resulting pixelized phosphors on the support are separated by a width of from about greater than 0.0 to 5.0 microns.

Optionally, a thin layer of light-reflective material or light-absorbing material can be deposited on the phosphor layer remaining in step (b) prior to operation of step (c). Also, optionally, the surface of the pixelized phosphor is planarized by lapping or etching or other techniques known to those skilled in the art, thereby removing the optionally deposited reflective layer from the surface of the pixelized phosphor not described by the slots.

In one preferred embodiment, the source of the electromagnetic radiation utilized in step (a) is an excimer laser. Unlike $CO_2$ and YAG:Nd lasers, an excimer laser ablation is based upon chemical surface alteration. This process is made possible due to the short wavelengths generated by the various excimer configurations (e.g., ArF yields 193 nm, KrF yields 248 nm, and XeCl yields 308 nm). With the chemical surface alteration, thermal side effects will be minimal leading to virtually no thermal degradation of the phosphor. The excimer laser triggers photochemical processes which result in a very precise and non-damaging processing.

In another preferred embodiment, the pixelized phosphors on the support are separated by a width of from 0.1–5.0 microns.

In still another preferred embodiment, the planarized phosphor in step (e) is coated with a protective layer afterwards.

In this application: "pixelized phosphor" means a phosphor element that is optically isolated from adjoining phosphor elements; "slot" means an empty space or gap which separates one phosphor element from another; "array" means a collection of elements arranged in a predetermined order; and "sensor" means a electronic device for converting electromagnetic radiation into a corresponding electrical signal (e.g., a photodiode or photoconductor).

Other aspects, advantages, and benefits of the present invention are apparent from the detailed description, the examples, and the claims.

DETAILED DESCRIPTION OF THE INVENTION

Figure 1:
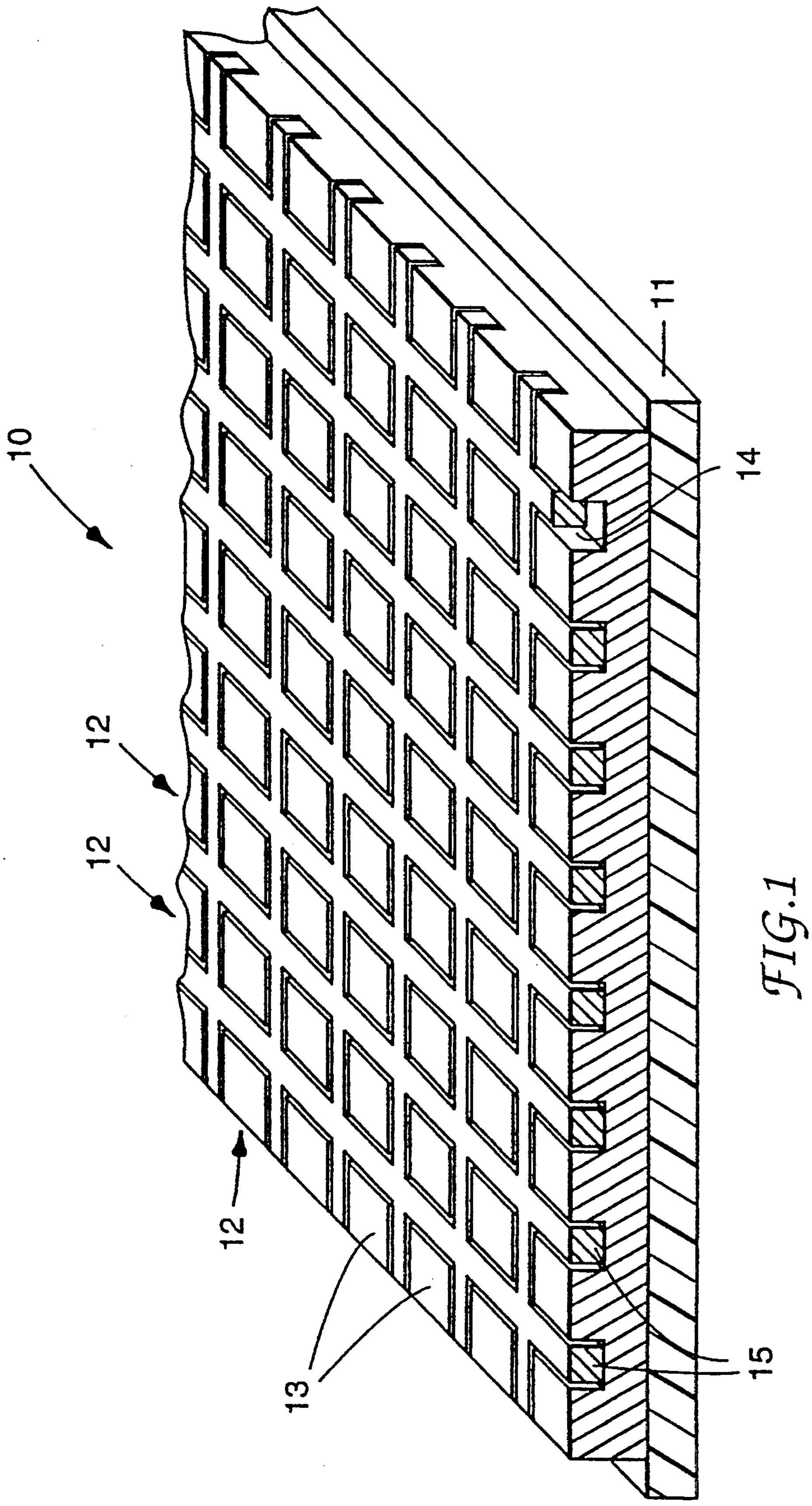
FIG. 1 is a perspective view of the details of the structure of the phosphor screen of the present invention.

Any conventional phosphor may be utilized in the present invention. Non-limiting examples of such phosphors include:

- phosphors represented by $BaSO_4:A_x$ (where A is at least one element selected from Dy, Tb, and Tm, and x satisfies $0.001 \leqq x < 1$ mol %) as disclosed in Japanese Patent Publication No. 80487/1973;
- phosphors represented by $MgSO_4:A_x$ (where A is either Ho or Dy, and x satisfies $0.001 \leqq x \leqq 1$ mol %) as disclosed in Japanese Patent Publication No. 80488/1973;
- phosphors represented by $SrSO_4:A_x$ (where A is at least one element selected from Dy, Tb and Tm, and x satisfies $0.001 \leqq x < 1$ mol %); as disclosed in Japanese Patent Publication No. 80489/1973;
- phosphors composed of $Na_2SO_4$, $CaSO_4$ or $BaSO_4$ containing at least one element selected from Mn, Dy and Tb as disclosed in Japanese Patent Publication No. 29889/1976;
- phosphors composed of BeO, LiF, $MgSO_4$ or $CaF_2$ as disclosed in Japanese Patent Publication No. 30487/1977;
- phosphors composed of $Li_2B_4O_7$:Cu or Ag as disclosed in Japanese Patent Application No. 39277/1978;
- phosphors represented by either $Li_2O.(B_2O_2)_x$:Cu (where x satisfies $2 < x \leqq 3$), or $Li_2O.(B_2O_2)_x$:Cu, Ag (where x satisfies $2 < x \leqq 3$), disclosed in Japanese Patent Publication No. 47883/1979;

phosphors represented by SrS:Ce, Sm; SrS:Eu, Sm; $La_2O_2S$:Eu, Sm; and (Zn,Cd)S:Mn, X (where X is halogen) as disclosed in U.S. Pat. No. 3,859,527;

phosphors represented by ZnS:Cu or Pb; barium aluminate phosphors represented by $BaO.(Al_2O_3)_x$.:Eu (where x satisfies $0.8 \leqq x \leqq 10$) and alkali earth metallosilicate phosphors represented by $M^{II}O_xSiO_2$:A (where $M^{II}$ is Mg, Ca, Sr, Zn, Cd or Ba; A is at least one element selected from Ce, Tb, Eu, Tm, Pb, Tl, Bi and Mn; and x satisfies $0.5 \leqq x < 2.5$) as disclosed in Japanese Patent Publication No. 12142/1980;

alkali earth fluorohalide phosphors represented by $(Ba_{1-x-y}Mg_xCa_y)FX:eEu^{2+}$ (where X is at least one of Br and Cl; and x, y and e satisfy $0 < x+y \leqq 0.6$, $xy \neq O$, and $10^{-6} \leqq e \leqq 5\times10^{-2}$, respectively);

phosphors represented by LnOX:xA (where Ln is at least one element selected from La, Y, Gd, and Lu; X is Cl and/or Br; A is Ce and/or Tb; and x satisfies $O < x < 0.1$) as disclosed in Japanese Patent Publication No. 12144/1980;

phosphors represented by $(Ba_{1-x}M^{II}_x)FX$:yA (where $M^{II}$ is at least one element selected from Mg, Ca, Sr, Zn, and Cd; X is at least one element selected from Cl, Br and I; A is at least one element from Eu, Tb, Ce, Tm, Dy, Pr, Ho, Nd, Yb, and Er; x and y satisfy $O \leqq x \leqq 0.6$ and $O \leqq y \leqq 0.2$, respectively) as disclosed in Japanese Patent Publication No. 12145/1980;

phosphors represented by BFX:xCe, yA (where X is at least one element selected from Cl, Br, and I; A is at least one element selected from In, Tl, Gd, Sm, and Zr; and x and y satisfy $O < x \leqq 2\times10^{-1}$ and $0 < y \leqq 5\times10^{-2}$, respectively) as disclosed in Japanese Patent Publication No. 84389/1980; rare-earth element-activated divalent metal fluorohalide phosphors represented by $M^{II}$FX.xA:yLn (where $M^{II}$ is at least one element selected from Mg, Ca, Ba, Sr, Zn, and Cd; A is at least one oxide selected from BeO, MgO, CaO, SrO, BaO, Zno, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; Ln is at least one element selected from Eu, Tb, Ce, Tm, Dy, Pr, Ho, Nd, Yb, Ev, Sm, and Gd; X is at least one element selected from Cl, Br and I; and x and y satisfy $5\times10^{-5} \leqq x0.5$ and $0 < y \leqq 0.2$, respectively) as disclosed in Japanese Patent Publication No. 160078/1980;

phosphors represented by either $xM_3(PO_4)_2.NX_2$:yA or $M_3(PO_4)_2$:yA (where each of M and N is at least one element selected from Mg, Ca, Sr, Ba, Zn, and Cd; X is at least one element selected from F, Cl, Br, and I; A is at least one element selected from Eu, Tb, Ce, Tm, Dy, Pr, Ho, Nd, Yb, Er, Sb, Tl, Mn, and Sn; and x and y satisfy $0 < x \leqq 6$ and $O \leqq y \leqq 1$, respectively); phosphors represented by either $nRX_3.mAX'_2$:xEu or $nReX_3.mAX'_2$:xEu, ySm (where R is at least one element selected from La, Gd, Y, and Lu; A is at least one element selected from Ba, Sr, and Ca; each of X and X' is at least one element selected from F, Cl, and Br; x and y satisfy $1\times10^{-4} < x < 3\times10^{-1}$ and $1\times10^{-4} < y < 1\times10^{-1}$, respectively; and n/m satisfies $1\times10^{-3} < n/m < 7\times10^{-1}$); alkaline halide phosphors represented by $M^IX.aM^{II}X_2'.bM^{III}X_3''$-:cA (where $M^I$ is at least one alkali metal selected from Li, Na, K, Rb, and Cs; $M^{II}$ is at least one divalent metal selected from Be, Mg, Ca, Sr, Ba, Zn, Cd, Cu, and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga, and In; each of X, X' and X'' is at least one halogen selected from F, Cl, Br, and I; A is at least one element selected from Eu, Tb, Ce, Tm, Dy, Pr, Ho, Nd, Yb, Er, Gd, Lu, Sm, Y, Tl, Na, Ag, Cu, and Mg; and the values a, b and c satisfy $0 \leqq a < 0.5$, $0 \leqq b < 0.5$ and $0 < c \leqq 0.2$ respectively) as disclosed in Japanese Patent Publication No. 148285/1982;

phosphors represented by cerium-doped Lutetium Oxyorthosilicate $Lu_{2(1-x)}Ce_{2x}(SiO_4)O$ as mentioned in the *IEEE Transactions of Nuclear Science*, vol. 34, no. 4, 1992, pp. 502–505;

phosphors represented by neodymium doped in Yttrium Orthosilicate ($Nd^{3+}:Y_2SiO_5$) as mentioned in *IEEE Journal of Quantum Electronics*, Vol. 26, No. 8, August 1990, pp.1405–1411 and in European Patent Application No. 0,253,589;

phosphors represented by $Gd_2O_2S$:R where R is at least one element selected from Tb, Eu, Pt, and Tm; and phosphors represented by thermoluminescent materials such as CsI:Na, LiF, and the like.

The presently preferred phosphors are ones composed of alkali metal halides.

The phosphor is deposited on a support by any suitable method. Non-limiting examples of such methods include:

The first method is vacuum evaporation. In this process, a vacuum evaporating apparatus into which a support has been placed is evacuated to a level of $10^{-6}$ Torr or so. Then, at least one aforementioned phosphor is vaporized by resistive heating, electron beam heating, or the like to produce a layer of the phosphor with a desired thickness formed on the surface of the support. The layer containing a phosphor can also be formed by repeating the vaporizing procedures a number of times. In addition, a covacuum evaporation can be conducted using a plurality of resistive heaters or electron beams. It is also possible to heat or cool the deposited layer during vaporization, if necessary, or to heat-treat the deposited layer after vaporizing.

After the vacuum evaporating operation, the phosphor-containing layer is optionally provided with a protective layer on its side opposite to the support. Alternatively, it is possible to have the phosphor layer formed on a protective layer first, and then to provide it with a support.

The second method is a sputtering technique. In this process, a sputtering apparatus in which a support has been placed is evacuated to about $10^{-6}$ Torr. Then, an inert gas such as Ar or Ne is introduced into the apparatus to raise the inner pressure up to a level of about $10^{-3}$ Torr. Afterwards, at least one aforementioned phosphor is sputtered to have a layer of the phosphor with a desired thickness deposited on the surface of the support. The phosphor layer can also be formed by repeating a plurality of sputtering procedures.

After the sputtering operation, the phosphor layer is provided with a protective layer on its side opposite to the support if necessary. Alternatively, it is allowed to have the phosphor layer formed on a protective layer first, and then provide it with a support.

The third method is chemical vapor deposition (CVD). In this method, the phosphor layer is obtained on the support by decomposing the intended phosphor or organometallic compound containing the raw material of the phosphor using thermal energy, high-frequency power, and the like.

The fourth method is a spraying technique. In this method, the phosphor layer is obtained by spraying phosphor powder onto a tacky layer of the support.

The fifth method is a baking method. In this method, an organic binder-containing phosphor powder dispersed therein is coated on a support which is then baked and thus, the organic binder is volatilized, and a phosphor layer without binder is obtained.

The sixth method is a curing method. In this method, an organic polymerizable binder containing phosphor powder dispersed therein is coated on a support which is then subjected to conditions which initiate and complete polymerization of the binder, thereby forming a solid composite mass of polymerized binder and phosphor.

The seventh method is a spray pyrolysis method. In this method, the phosphor is formed by spraying a solution of base elements suspended in a suitable volatilizable carrier onto a heated support which causes the vaporization of the carrier during deposition of the phosphor.

The thickness of the phosphor layer is varied according to the radiosensitivity of the intended radiographic image panel, and the type of the phosphor, but is preferably selected from a range from 30 μm to 1000 μm, especially from 50 μm to 800 μm.

When the thickness of the phosphor layer is less than 30 μm, the radiation absorptance thereof deteriorates rapidly, thereby lowering the radiation sensitivity. The graininess of an image obtained therefrom is increased causing a deteriorated image. In addition to the foregoing, the phosphor layer becomes transparent and thus, the two dimensional spreading of excitation rays in the phosphor layer is greatly increased, which results in the tendency wherein image sharpness is deteriorated.

The support for the phosphor can be various polymeric materials, glass, tempered glass, quartz, metals, and the like. Among them, flexible or easily roll-processable sheet materials are especially suitable in view of the handling of information recording material. From this point of view, the especially preferable material of is, for example, plastic film as cellulose acetate, polyester, polyethylene terephthalate, polyamide, polyimide, cellulose triacetate or polycarbonate film, or metallic sheets such as aluminum, steel, or copper.

The process of forming the pixelized phosphor can also be made on a substrate consisting of a sensor array or on a multitude of sensor arrays which can be described as being a "sub-module". A collection of submodules can be assembled to form a complete, large-size radiographic imaging panel. The sensor array can be made of amorphous silicon, single crystal silicon, cadmium telluride, copper indium diselenide, and other sensor materials known to one skilled in the art. In the case of single crystal silicon, the sensor array can be a conventional sensor array on a silicon wafer from about 300 to about 700 microns in thickness. Additionally, the sensor array can be on a thinned silicon wafer, preferably from about 10–300 microns in thickness and more preferably, from about 10–30 microns in thickness. A sensor array on a sufficiently thinned silicon wafer has the advantage of being transparent to light so that the phosphor can illuminate the sensor array through the silicon, from the side opposite of the light detecting sensor. This manner of illumination is termed "back-illumination".

Alternatively, the phosphor can also be made on a fiber optic element. The fiber optic element can be composed of a large bundle of individual optical fibers which are joined parallel to each other so that an image projected into one end of the bundle will be transmitted uniformly to the other end of the bundle maintaining a one-to-one correspondence of the relative positions of different portions of the image. The light transmitting surface of this bundle of fiber optics can be sufficiently smoothed by polishing so as to permit the uniform deposition of a phosphor layer which can be cellularized to form the array of pixelized phosphors.

The deposited phosphor is then pixelized or cellularized by exposing the phosphor material to electromagnetic radiation, using suitable masking techniques, thereby ablating the phosphor segmentally to produce a series of structures in both the X and Y directions to produce an array.

Any suitable source may be used to generate the electromagnetic radiation such as an excimer laser, $CO_2$ laser, or YAG:Nd laser. The power density required to ablate the phosphor will vary depending on the composition of the phosphor; the beam size; and the type of substrate used and will be readily apparent to those of ordinary skill in the art. The upper limit of the power density required is restricted to prevent destruction of the substrate material. For example, in the case of an excimer laser with a 20 nanosecond pulse width, the amount of power density will preferably be in the range of from about 30–700 $J/cm^2$, more preferably from about 60–240 $J/cm^2$.

Excimer lasers are presently preferred. An excimer laser is an exited dimer laser where two normally non-reactive gases (for example Krypton, Kr, and Fluorine, $F_2$) are exposed to an electrical discharge. One of the gases (Kr) is energized into an excited state (Kr*) in which it can combine with the other gas ($F_2$) to form an excited compound (KrF*). This compound gives off a photon and drops to an unexcited state which, being unstable, immediately disassociates to the original gases (Kr and $F_2$) and the process is repeated. The released photon is the laser output. The uniqueness of the excimer laser is its high efficiency in producing short wavelength (UV) light and its short pulse widths. These attributes make the excimer laser useful for industrial applications.

Suitable masking techniques are well known, and include shadow masking wherein the mask is in intimate contact with the layer to be ablated, and projection masks which require an optical system to either enlarge or shrink the masking pattern projected onto the layer to be ablated.

Optionally, a thin layer (e.g., 5000 Angstroms) of a suitable highly light-reflective material, such as gold or silver, can be formed on the walls of the slots formed from step (b). A sputtering, evaporation, electrodeless plating, or other thin film deposition techniques can be utilized.

Also optionally, a black or absorbing material can be deposited to minimize light scattering. This manner of coating will confine the light within a pixel boundary; however, the total light output from the pixel may be decreased due to the absorbing of light by the deposited material.

In step (c), phosphor material of the same or different composition as utilized in step (a) is deposited into the slots such that the resulting pixelized or cellularized phosphors are separated by a width of from greater than 0.0 to 5.0 microns and preferably of about 0.1 to 5.0 microns.

In step (c), using a phosphor material of a different composition than that used in step (a) may enhance the containment of light within a single pixel since the differences in the index of refraction will cause light traversing within a pixel to be reflected back into the pixel when the index of refraction within the pixel is greater than that exterior to the pixel.

The resulting phosphors and thin metal films, if utilized, can then be planarized by any suitable method such as mechanical abrasion, ion milling, chemical etching, and mechano-chemical lapping.

The following non-limiting examples further illustrate the present invention.

EXAMPLE 1

Cesium iodide (CsI) was loaded into an SM-12 boat for evaporative deposition. The substrate chosen for this example was an aluminum plate measuring 3"×3", placed so that the boat-to-substrate distance was approximately 2 inches. The deposition was completed after 30 minutes at a temperature of 120° C., and a current of 200 amperes. This resulted in a total deposited phosphor thickness of approximately 100 microns. The deposited phosphor was ablated into square projections of pixels 130 microns on an edge, and having a center-to-center distance of 170 microns using an excimer laser operating at an energy of 200 mJ, 100 Hz, and 248 nm resulting in a power density of 138 J/cm$^2$. A rectangular mask and focusing lens was utilized to result in an image size of 0.075" by 0.003", and the sample was scanned at a rate of 0.2 inches/sec. The resulting X-Y scribed pattern of phosphor was again subjected to the same deposition conditions to fill in the ablated areas, which resulted in a gap of 20 microns between the 150×150 micron pixels, 200 microns in height, formed by the two separate depositions.

EXAMPLE 2

The same conditions as those used in Example 1 were used with the additional step of metal deposition to form reflective, isolating walls on the first series of pixel structures prior to the second deposition of the CsI phosphor. Specifically, a thin layer (5000 Angstroms) of silver was sputtered onto the patterned surface of the phophor and the second deposition of the phosphor continued as before.

EXAMPLE 3

A commercial scintillation screen (Trimax T2, 3M Company) was patterned using a $CO_2$ laser operating at a wavelength of 10.6 microns. The resulting pattern consisted of 125 micron diameter holes, with a surface roughness around the holes of about 20 microns.

EXAMPLE 4

Phosphor ($Gd_2O_2S$:Tb, Trimax T16, 3M Company) was coated on a poly(ethylene terephthalate) (i.e., PET) sheet coated with silver (2,000 Angstroms) at a thickness of 100 microns using a pressing technique. The phosphor was ablated to form holes of 100 microns diameter, using a $CO_2$ laser. The ablation conditions were as follows: cavity pressure of 16 mBar, pulse length of 0.1 milli-seconds, pulse spacing of 0.006", feed rate of 1100 inches/minute, power of 48 Watts (CW), gas mix of 14% $CO_2$, assisting gas: nitrogen at 10 psi. The walls of the holes were coated with 0.3 microns of aluminum by sputtering using a Perkin-Elmer Model 2400 Sputtering System. Holes in the sample were then filled with the same phosphor composition, but different particle size distribution ($Gd_2O_2S$:Tb, Trimax T6, 3M Company) using a doctor blade technique in vacuum. The residual aluminum (3,000 Angstroms) on the phosphor was removed, by lapping, using a combination of alumina and fine sand paper.

EXAMPLE 5

Phosphor ($Gd_2O_2S$:Tb, Trimax T16, 3M Company) was coated on a PET sheet. The phosphor of a thickness of 25 microns was opened with square holes of 50 microns×50 microns to form a "checkerboard pattern". The holes in the phosphor were then filled with phosphor of the same composition, but different particle size distribution ($Gd_2O_2S$:Tb, Trimax T6, 3M Company). The holes were covered with an additional layer of phosphor of 50 microns. SEM (Scanning Electron Microscopy) did not show any slot gap between the two phosphors, however, the boundary between the two phosphors of different particle size distributions could easily be ascertained.

EXAMPLE 6

The same conditions as those used in Example 1 were employed with the first deposition of phosphor using sodium doped CsI (CsI:Na). The coating thickness was 75 microns and square holes 53 microns×53 microns were opened up in the phosphor using an excimer laser. The second deposition of phosphor used thallium doped CsI (CsI:Tl), sufficient to completely fill in the holes formed in the first phosphor layer. The resulting pixelized phosphor screen exhibited no slot gap between the two phosphors of different composition, the sodium doped phosphor emitting light in the blue region and the thallium doped phosphor emitting light in the green region.

With reference to FIG. 1, the present invention provides a pixelized phosphor screen (10) comprising an array (12) of pixelized phosphor elements (13) on a support (11) which are separated by a gap (14) having a width of greater than 0.0 to about 5.0 microns.

Reasonable modifications and variations are possible from the foregoing disclosure without departing from either the spirit or scope of the present invention as defined in the claims.

What is claimed is:

1. A pixelized phosphor screen consisting essentially of an array of pixelized phosphors on a support which are separated by a width of from greater than 0.0 to 5.0 microns, said pixelized phosphor screen made by the process consisting essentially of the following steps:

(a) depositing a phosphor on a support;

(b) exposing the deposited phosphor to a source of electromagnetic radiation through a mask thereby removing the phosphor segmentally, resulting in a series of structures in both the X and Y directions to produce an array of pixelized phosphors separated by slots; and (c) filling the resulting slots between said pixelized phosphors with phosphor material of the same or different composition as utilized in step (a) such that each of said pixelized phosphors on said support are separated by a width of from greater than 0.0 to 5.0 microns.

2. The pixelized phosphor screen according to claim 1 wherein said phosphor comprises alkali metal halide.

3. The pixelized phosphor screen according to claim 1 wherein said phosphor comprises gadolinium oxide sulfide.

4. The pixelized phosphor screen according to claim 1 wherein said phosphor comprises BaFX, where X is at least one element selected from the group consisting of Cl, Br, and I.

5. The pixelized phosphor screen according to claim 1 wherein said array of pixels in 1(b) are separated by slots having a width of from greater than 0.0 to 5.0 microns.

6. A pixelized phosphor screen consisting essentially of an array of pixelized phosphors on a support which are separated by slots having a width of from 0.1 to 5.0 microns, said slots having deposited on the walls thereof a film of a light-reflective or light-absorbing material, said pixelized phosphor screen made by the process consisting essentially of the following steps:

(a) depositing a phosphor on a support;

(b) exposing the deposited phosphor to a source of electromagnetic radiation through a mask thereby ablating the phosphor segmentally, resulting in a series of structures in both the X and Y directions to produce an array of pixelized phosphors separated by slots;

(c) depositing a film of a light-reflective or light-absorbing material on the walls of said slots; and (d) filling the resulting slots between said pixelized phosphor material of the same or different composition as utilized in step (a) such that each of said pixelized phosphors on said support are separated by a width of from greater than 0.0 to 5.0 microns.

7. A pixelized phosphor screen consisting essentially of an array of pixelized phosphors on a support which are separated by slots having a width of from greater than 0.0 to 5.0 microns and wherein said pixelized phosphors are of at least two different compositions, said pixelized phosphor screen made by the process consisting essentially of the following steps:

(a) depositing a phosphor on a support;

(b) exposing the deposited phosphor to a source of electromagnetic radiation through a mask thereby removing the phosphor segmentally, resulting in a series of structures in both the X and Y directions to produce an array of pixelized phosphors separated by slots; and (c) filling the resulting slots between said pixelized phosphor material with a phosphor of different composition as utilized in step (a) such that each of said pixelized phosphors on said support are separated by a width of from greater than 0.0 to 5.0 microns.

* * * * *